April 21, 1936.  E. K. BROWN  2,038,474
ANTIFRICTION BEARING AND METHOD OF MAKING THE SAME
Filed Nov. 7, 1933
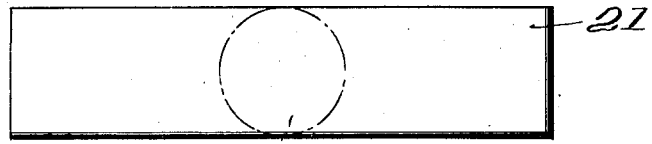
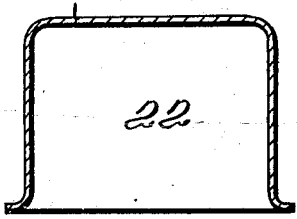
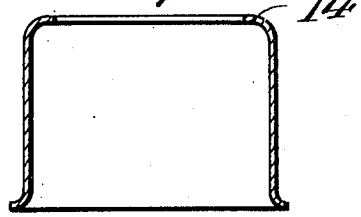
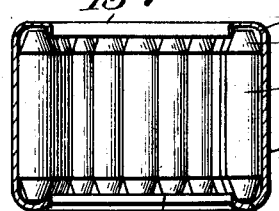
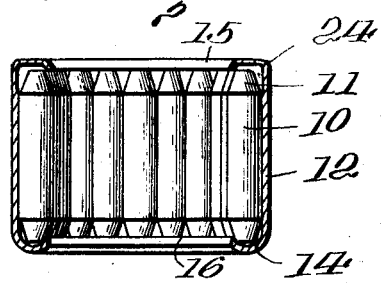
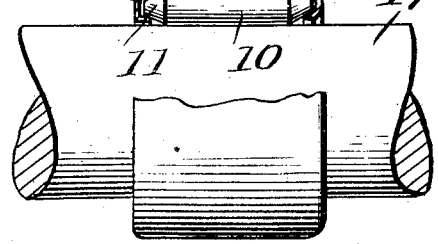
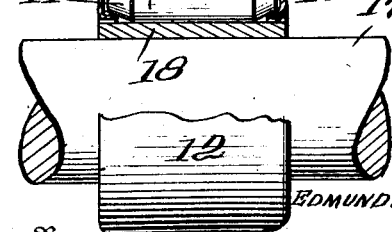
Inventor
EDMUND K. BROWN
By Sturtevant, Mason + Porter
Attorneys Patented Apr. 21, 1936

2,038,474

UNITED STATES PATENT OFFICE 2,038,474

ANTIFRICTION BEARING AND METHOD OF MAKING THE SAME

Edmund K. Brown, Torrington, Conn., assignor to The Torrington Company, Torrington, Conn., a corporation of Connecticut Application November 7, 1933, Serial No. 697,045

13 Claims. (Cl. 29—148.4)

The present invention relates to improvements in antifriction bearings, and more particularly to an improved roller bearing or bushing, and to an improved method of making and assembling the same.

An object of the present invention is to provide an improved roller bearing wherein a plurality of small diameter rollers having reduced end portions are placed in substantially contiguous relation within a retaining sleeve, the ends of which are adapted to be curled inwardly to enclose the reduced ends of the rollers whereby to hold the rollers in proper position and to permit the central portion of the rollers to extend within the sleeve beyond the inner edges of the curled ends thereof.

A further object of the invention is to provide an improved roller bearing, of the type referred to, wherein the retaining sleeve is adapted to be used as an outer raceway element, thus simplifying the manufacturing costs.

A still further object of the present invention is to provide an improved method of making the retaining sleeve and of assembly and holding the small diameter rollers therein.

The invention still further aims to provide an improved roller bearing, of the type referred to, which is well adapted for use as a bearing bushing in connection with rotating parts.

The present method of making and assembling the roller bearing is one which materially reduces the cost of manufacture and yet increases the efficiency of such a bearing.

These and other objects of the invention will in part be obvious and will be hereinafter more fully pointed out.

In the accompanying drawing:

Fig. 1 is a view of a metal strip from which the sleeve blanks are cut.

Fig. 2 is an enlarged view showing one stage in the forming of the blank.

Fig. 3 is an enlarged view showing a further stage in the forming of the blank into its final form.

Fig. 4 is a view similar to Fig. 3, showing the cup-shaped blank after a portion of the closed end thereof has been removed.

Fig. 5 is an enlarged view showing the formed blank with the bottom flange finally formed and with the opposite end portion thereof slightly reduced in thickness.

Fig. 6 is an enlarged view showing the thin end of the sleeve bent to a substantially horizontal position so that the rollers may be inserted.

Fig. 7 is a view of the completed bearing.

Fig. 8 is a view showing the completed bearing in position with a shaft.

Fig. 9 is a similar view showing an inner sleeve pressed on a shaft and the completed bearing associated therewith.

The present invention consists generally in providing a roller bearing which is exceedingly well adapted to be used in place of the usual bearing bushings which are ordinarily employed with rotating shafts. A retaining sleeve is adapted to hold a plurality of small diameter rollers in contiguous relationship. The rollers are provided with reduced end portions which, when inserted in the retaining sleeve, are adapted to be enclosed and held by the curled end portions of the said retaining sleeve. Thus, the body portion of the rollers, that is, the portion between the reduced ends thereof, is adapted to extend beyond the inner edge of the curled end portions so that a roller contact is afforded for the shaft with which the bearing is to be used. The retaining sleeve serves not only as a holder for the rollers but also as a raceway element. In the drawing, the sleeve is shown, for purposes of illustration, as being an outer raceway element. In this instance, the shaft, with which the bearing is to be associated, serves as the inner race, but an additional sleeve may be pressed on the shaft to serve as an inner race, if it is so desired. The invention also affords a novel and inexpensive manner of forming the retaining shell and of assembling the rollers therein and finally securing the reduced end portions of the rollers within the curled ends of the sleeve.

The invention will now be described in detail and reference will be made to the accompanying drawing. In Figs 7, 8 and 9 the completed bearing is illustrated. The rollers 10 are of relatively small diameter and are of circular cross-section throughout the main body portion thereof. However, the relative length and diameter of the rollers will depend upon the particular use to which the bearing is to be put. The ends 11 of the rollers are reduced in cross-section and are shown in the accompanying drawing as being of the chamfered type, but it is to be understood that they may be of any type which affords a reduced end portion for the purposes which are to be hereinafter pointed out. The race 12 consists of a cylindrical sleeve or shell which may be formed from a metal blank in a manner to be described later. The end portions 13, 14 of the sleeve 12 are bent inwardly and the annular edges 15, 16 thereof are further curled within the sleeve in order to provide a grooved flange to enclose the reduced ends 11 of the rollers 10. The annular edges 15 and 16 of the end portions 13, 14 respectively present continuous and uninterrupted surfaces around the same. The rollers 10 are fitted in the shell in substantially contiguous relationship and the cylindrical body portions thereof extend beyond the curled edges 15, 16 of the end portions so that there is provided a roller contacting surface for a shaft or the like. Opposite reduced ends 11 of each roller 10 are disposed within the end portions 13, 14 of the sleeve 12 and are free to contact therewith and with the annular edges 15, 16 of the end portions 13, 14 respectively. The annular edges 15, 16 do not inhibit the free action of the rollers 10 but, as stated above, the reduced ends 11 of the rollers are free to contact with the said edges in order to prevent removal of the rollers and thus provide a self-contained bearing. The reduced end portions of the rollers thus serve an important function in that they permit the end portions of the sleeve to hold the rollers within the sleeve and, at the same time, permit the body portion of the rollers to extend beyond the edges 15, 16 in order to contact with a rotating member. This completed bearing may be employed to replace the usual bushings which are used. As shown in Fig. 8, the bearing may be fitted directly on a shaft 17, or, as shown in Fig. 9, a sleeve 18 may be pressed on a shaft 17a and the bearing may be fitted thereon. In the first instance (Fig. 8), the sleeve 12 serves as the outer raceway element and the shaft 17, itself, serves as an inner raceway. In the second instance (Fig. 9), the sleeve 12 also serves as the outer raceway element, but the pressed sleeve 18 serves as the inner raceway element.

As to the manner of forming the sleeve 12 and of assembling the rollers 10 therein, reference will be had to Figs. 1–7 inclusive. A blank 20 is stamped or otherwise cut from a metal strip 21. This blank is then operated upon by a drawing or forming press which gradually forms the blank into a cylindrical cup-shaped element 22, as shown in Fig. 3. The central portion of the closed end 23 of the cup-shaped blank is then removed by a punching or other suitable process in order to leave the inwardly extending flange portion 14. It is, of course, to be understood that this punching operation may be performed at some other stage, as for instance, at the beginning of the forming operation, or at some intermediate stage. The open end of the cup-shaped blank is accurately cut to circular shape. The extreme edge 16 of the flange 14 is then forced inwardly, as shown in Fig. 5, to form a trough which is adapted to receive and enclose one end of the rollers. The opposite or open end portion 24 of the sleeve is then drawn so that the thickness thereof is slightly reduced. This step is of importance because this end must also be curled inwardly to enclose the opposite ends of the rollers and in so doing, there is a tendency for the metal to crowd and buckle and by reducing the thickness of the metal at this point, the tendency to buckle is obviated. If the end portion should be curled outwardly, the metal would tend to spread and so there would be no necessity to reduce the thickness thereof in such a case. This end portion 24 is bent inwardly to a substantially horizontal position, as shown in Fig. 6. When the retaining sleeve has reached this point, it is subjected to any suitable hardening and polishing process. The rollers 10 are then placed in the retaining sleeve 12, as shown in Fig. 6, the upper ends 11 thereof being permitted to slide under the horizontal flange 24 with the lower ends seated in the trough formed by the pre-curled end portion 14. The extreme edge 15 of the thin portion 24 is then rolled or otherwise curled inwardly, as shown in Fig. 7. The edge 15 encloses the ends of the rollers and so retains them in place. The curled edges 15, 16 do not prevent the free rotation of the rollers 10 under conditions of use.

It is thus apparent, from the foregoing description of the invention, that a highly efficient roller bearing is herewith provided. This roller bearing is made by a method which renders the same inexpensive and highly efficient. The bearing is particularly useful, because in handling and assembling rollers of very small diameter, it is often difficult to secure the same in position. By this invention, however, the novel retaining shell is perfectly adapted to enclose the reduced ends of the rollers and so hold the same in place. This bearing has an important use in being extremely well adapted in employment as a replacement for the usual bronze and brass bushings for shafts.

It is to be understood, of course, that minor details and changes may be made without departing from the scope of the invention as set forth in the appended claims.

Having thus fully described my invention what I claim as new and desire to secure by Letters Patent, is:—

1. The method of making a roller bearing assembly which consists in forming from a metal blank a cylindrical sleeve having an inwardly extending flange at one end thereof, forming said flange into trough shape, reducing the thickness of the metal at the opposite end of said sleeve, inserting a plurality of cylindrical rollers having reduced ends into said sleeve in substantially contiguous relation with one of the reduced ends of each of said rollers enclosed within said trough-shaped flange, and forcing the reduced end portion of the opposite end of said sleeve inwardly to enclose the opposite reduced ends of said rollers whereby to retain the rollers in position with the cylindrical body portions thereof protruding beyond the inner edges of the inwardly curled end portions of the sleeve.

2. The method of making a roller bearing assembly which consists in forming from a metal blank a cup-shaped shell, removing the central portion of the closed end of said shell to leave an inwardly extending flange around the sleeve, curling the edge of said flange whereby to provide a trough-shaped flange, reducing the thickness of the metal at the opposite end of said shell, subjecting the shell to a hardening and polishing process, inserting a plurality of cylindrical rollers having reduced end portions in said shell with one end of each roller enclosed within said trough-shaped flange, and curling the thin end portion of the shell over the opposite reduced ends of said rollers whereby to retain said rollers in position with the cylindrical body portions thereof extending beyond the edges of the inwardly curled ends of the shell.

3. The method of making a roller bearing assembly which consists in forming from a metal blank a cup-shaped shell, removing the central portion of the closed end of said shell whereby to leave a cylindrical sleeve with an inwardly extending flange at one end thereof, curling said flange into a trough shape, reducing the thickness of the metal at the opposite end of said sleeve, bending the thin end portion at substantially right angles to the sleeve, subjecting the sleeve to a hardening and polishing process, inserting a plurality of cylindrical rollers having reduced ends in said sleeve in substantially contiguous relation with one reduced end of each roller enclosed within said trough-shaped flange and with the opposite reduced end of each roller beneath the right angled thin end portion of the sleeve, and finally forcing the edge of the thin end portion inwardly to enclose the ends of the rollers whereby to retain them in position with the cylindrical body portions thereof extending within the sleeve beyond the edges of the inwardly turned ends of the sleeve.

4. The method of making a self-contained roller bearing assembly which consists in forming from a metal blank a cup-shaped member having a cylindrical body portion, forming an annular groove in the radially extending portion of said member, reducing the thickness of the opposite end of said member, bending the reduced portion inwardly, curling the extreme edge of said reduced portion axially toward the opposite end of said member, inserting a plurality of cylindrical rollers having reduced ends into said member in substantially contiguous relation with one of the reduced ends of each of said rollers in said annular groove and with the opposite end of each of said rollers within the extreme end of the reduced portion, and finally forcing said reduced portion and the extreme edge thereof inwardly to enclose the adjacent reduced ends of said rollers whereby to retain said rollers within said member with the cylindrical body portions thereof extending beyond the edge of said annular groove and the extreme edge of said reduced portion in order to provide a roller contact surface within said member.

5. The method of making a self-contained roller bearing assembly which consists in forming from a metal blank a cup-shaped member having a cylindrical body portion, forming an annular groove in the radially extending portion of said member reducing the thickness of the opposite end of said member, bending the reduced portion inwardly, curling the extreme edge of said reduced portion axially toward the opposite end of said member, subjecting said member to a suitable hardening and polishing process, inserting a plurality of cylindrical rollers having reduced ends into said member in substantially contiguous relation with one of the reduced ends of each of said rollers in said annular groove and with the opposite end of each of said rollers within the extreme end of the reduced portion, and finally forcing said reduced portion and the extreme edge thereof inwardly to enclose the adjacent reduced ends of said rollers whereby to retain said rollers within said member with the cylindrical body portions thereof extending beyond the edge of said annular groove and the extreme edge of said reduced portion in order to provide a roller contact surface within said member.

6. The method of making a self-contained roller bearing assembly which consists in forming from a metal blank a cup-shaped member having a cylindrical body portion, removing a central portion of the closed end of said member, forming an annular groove in the radially extending portion of said member, reducing the thickness of the opposite end of said member, bending the reduced portion inwardly, curling the extreme edge of said reduced portion axially toward the opposite end of said member, inserting a plurality of cylindrical rollers having reduced ends into said member in substantially contiguous relation with one of the reduced ends of each of said rollers in said annular groove and with the opposite end of each of said rollers within the extreme end of the reduced portion, and finally forcing said reduced portion and the extreme edge thereof inwardly to enclose the adjacent reduced ends of said rollers whereby to retain said rollers within said member with the cylindrical body portions thereof extending beyond the edge of said annular groove and the extreme edge of said reduced portion in order to provide a roller contact surface within said member.

7. The method of making a self-contained roller bearing assembly which consists in forming from a metal blank a cup-shaped member having a cylindrical body portion, removing a central portion of the closed end of said member, forming an annular groove in the radially extending portion of said member, reducing the thickness of the opposite end of said member, bending the reduced portion inwardly, curling the extreme edge of said reduced portion axially toward the opposite end of said member, subjecting said member to a suitable hardening and polishing process, inserting a plurality of cylindrical rollers having reduced ends into said member in substantially contiguous relation with one of the reduced ends of each of said rollers in said annular groove and with the opposite end of each of said rollers within the extreme end of the reduced portion, and finally forcing said reduced portion and the extreme edge thereof inwardly to enclose the adjacent reduced ends of said rollers whereby to retain said rollers within said member with the cylindrical body portions thereof extending beyond the edge of said annular groove and the extreme edge of said reduced portion in order to provide a roller contact surface within said member.

8. A roller bearing assembly comprising a raceway element consisting of a single one-piece metal sleeve having a radially extending annular retaining trough at one end thereof and a plurality of small diameter cylindrical rollers having the ends thereof reduced in cross-section, said rollers being fitted around said sleeve in substantially contiguous relationship with one reduced end of each roller disposed within said trough, the opposite edge of said sleeve being bent radially to enclose the opposite reduced end of each roller, said reduced ends of each roller being free to contact with said trough and the opposite edge of said sleeve whereby to provide a self-contained bearing assembly which may be handled as a unit.

9. A roller bearing assembly comprising a raceway element consisting of a single one-piece sheet metal sleeve having an inwardly extending annular retaining trough at one end thereof, and a plurality of small diameter cylindrical rollers having the ends thereof reduced in cross-section, said rollers being fitted around said sleeve in substantially contiguous relationship with one reduced end of each roller disposed within said annular trough and with the cylindrical body portions of the rollers extending beyond the inner edge of said trough, the opposite edge of said sleeve being bent inwardly to partially enclose the opposite reduced end of each roller and lying within the body portions of the rollers, said reduced ends of each roller being free to contact with the inner edge of said trough and with the opposite edge of said sleeve whereby to provide a self-contained roller bearing which may be handled as a unit and which affords an inner roller contact surface.

10. A self-contained anti-friction bearing comprising a raceway element consisting of a single one-piece metal sleeve having laterally extending retaining flanges, one at each end thereof, each of said flanges presenting a continuous and uninterrupted surface around the free edges thereof, and a plurality of small diameter cylindrical rollers having the ends thereof reduced in cross-section, said rollers being fitted around said sleeve in contact therewith and with each other and with the reduced ends thereof disposed within said retaining flanges, the continuous free edges of said flanges overlying the reduced ends of said rollers, the reduced ends of said rollers being free to contact with the free edges of said flanges whereby to provide a self-contained anti-friction bearing which may be handled as a unit.

11. The method of making a roller bearing assembly which consists in forming from a metal blank a cylindrical sleeve having at one end thereof an inwardly directed retaining flange with the free edge thereof directed axially of said sleeve, placing in contact with said sleeve a plurality of small diameter cylindrical rollers having reduced ends with one reduced end of each roller disposed within said flange, and shaping the opposite end of said sleeve to overlie the opposite reduced end of each of said rollers with the free edge thereof free to contact with the said reduced ends whereby to hold said rollers and sleeve as a unit.

12. The method of making a roller bearing assembly which consists in forming an annular flange at one end of a metal sleeve, assembling a plurality of small diameter cylindrical rollers in contact with said sleeve and with one reduced end of each of said rollers disposed within and free to contact with said flange, and shaping the opposite end of said sleeve after the rollers have been assembled therein to form a similar flange enclosing the opposite reduced ends of said rollers with the said opposite reduced ends free to contact with said flange.

13. The method of making a roller bearing assembly which consists in forming an annular flange at one end of a metal sleeve, reducing the thickness of the metal at the opposite end of the sleeve, assembling a plurality of small diameter cylindrical rollers in contact with said sleeve and with one reduced end of each of said rollers disposed within and free to contact with said flange, and shaping the reduced portion of the sleeve after the rollers are assembled therein to form a similar flange enclosing the opposite reduced ends of said rollers with the said opposite reduced ends free to contact with said flange.

EDMUND K. BROWN.